(12) United States Patent (10) Patent No.: US 12,586,138 B2

Takagi (45) Date of Patent: Mar. 24, 2026

(54) CHARGING SYSTEM

(71) Applicant: SUBARU CORPORATION, Tokyo (JP)

(72) Inventor: Yasushi Takagi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 19/015,480

(22) Filed: Jan. 9, 2025

(65) Prior Publication Data

US 2025/0148551 A1 May 8, 2025

Related U.S. Application Data

(63) Continuation of application No. PCT/JP2023/025038, filed on Jul. 5, 2023.

(51) Int. Cl.
| | |
|---|---|
| *G06Q 50/06* | (2024.01) |
| *B60L 53/65* | (2019.01) |
| *G06F 11/07* | (2006.01) |
| *G06Q 10/02* | (2012.01) |

(52) U.S. Cl.
CPC ......... *G06Q 50/06* (2013.01); *G06F 11/0739* (2013.01); *G06F 11/0787* (2013.01); *G06Q 10/02* (2013.01); *B60L 53/65* (2019.02)

(58) Field of Classification Search
CPC .... G06Q 50/06; G06Q 10/02; G06F 11/0739; G06F 11/0787; B60L 53/65
See application file for complete search history.

(56) References Cited

U.S. PATENT DOCUMENTS

| | | |
|---|---|---|
| 2012/0098676 A1 | 4/2012 | Oizumi et al. |
| 2020/0347229 A1 | 11/2020 | Fujisawa et al. |
| 2022/0305942 A1* | 9/2022 | Mannepalli ............. B60L 53/68 |

(Continued)

FOREIGN PATENT DOCUMENTS

| | | |
|---|---|---|
| JP | 2011-13893 A | 1/2011 |
| WO | 2018043270 A1 | 3/2018 |

OTHER PUBLICATIONS

Juan Liu, Research on electric vehicle fast charging station billing and settlement system, 2017, p. 223-224 (Year: 2017).*

(Continued)

*Primary Examiner* — Ibrahim N El-Bathy

(74) *Attorney, Agent, or Firm* — Rimon P.C.

(57) ABSTRACT

A charging system includes a charging station, a control device, and a storage device. The charging station charges a vehicle. The storage device stores a charging error database. The control device includes at least a processor and a memory coupled to the at one processor. The processor performs a process including: accepting check-in of the vehicle at the charging station; accepting a reservation for charging of the vehicle at the charging station; acquiring first vehicle identification information; acquiring second vehicle identification information; determining whether the first vehicle identification information matches the second vehicle identification information; permitting the check-in when the first vehicle identification information matches the second vehicle identification information; and generating error information based on the charging error database. The vehicle presents the generated error information to an occupant at the time of the reservation.

6 Claims, 9 Drawing Sheets

(56) References Cited

U.S. PATENT DOCUMENTS

2023/0182608 A1 * 6/2023 Suto ...................... G06Q 50/06
                                                         320/137
2025/0165876 A1 * 5/2025 Okada .................... G06Q 10/02

OTHER PUBLICATIONS

International Search Report received in PCT Application No. PCT/JP2023/002547, dated Mar. 7, 2023.

* cited by examiner

FIG. 3

| CHARGING AREA | CHARGING STATION | VEHICLE MODEL | ERROR DETAILS |
|---|---|---|---|
| A | A0002 | CAR000X | CONNECTOR CONNECTION ERROR |
| C | C0001 | CAR000Y | CREDIT CARD READING ERROR |
| D | D0003 | CAR000Z | EXCESSIVE VOLTAGE ERROR |
| ⋮ | ⋮ | ⋮ | ⋮ |

FIG. 7

| FIRST CHARGING AREA | | | |
|---|---|---|---|
| CHARGING STATION | OTHER-VEHICLE CHECK-IN INFORMATION | OTHER-VEHICLE RESERVATION INFORMATION | ERROR INFORMATION |
| A0001 | 2 VEHICLES | 2 VEHICLES | NO ERRORS |
| A0002 | 1 VEHICLE | 2 VEHICLES | CONNECTOR CONNECTION ERROR |

| SECOND CHARGING AREA | | | |
|---|---|---|---|
| CHARGING STATION | OTHER-VEHICLE CHECK-IN INFORMATION | OTHER-VEHICLE RESERVATION INFORMATION | ERROR INFORMATION |
| A0001 | 0 VEHICLES | 1 VEHICLE | NO ERRORS |
| A0002 | 0 VEHICLES | 0 VEHICLES | NO ERRORS |

CHARGING SYSTEM

CROSS REFERENCE TO RELATED APPLICATIONS

This application is continuation of International Application No. PCT/JP2023/025038, filed on Jul. 5, 2023, the entire contents of which are hereby incorporated by reference.

BACKGROUND

The present disclosure relates to a charging system in which charging is performed.

For example, Japanese Unexamined Patent Application Publication (JP-A) No. 2011-13893 discloses a technique for forecasting the possibility that a vehicle will be charged at a charging station. In JP-A 2011-13893, the smaller the battery remaining amount of the vehicle is, the higher the forecast charging possibility is, and the larger the battery remaining amount is, the lower the forecast charging possibility is.

SUMMARY

An aspect of the disclosure provides a charging system. The charging system includes a charging station, a control device, and a storage device. The charging station is configured to charge a vehicle. The storage device is configured to store a charging error database in which a history of errors at a time of charging of the vehicle at the charging station is accumulated in association with the charging station, the vehicle, and details of the errors. The control device includes at least one processor and at least one memory coupled to the at least one processor. The at least one processor is configured to perform a process including: accepting check-in that is a procedure for starting the charging of the vehicle at the charging station; accepting, before the check-in, a reservation for the charging of the vehicle at the charging station; acquiring, at a time of the reservation, vehicle identification information that is information for identifying the vehicle from the vehicle that makes the reservation; acquiring, at a time of the check-in, the vehicle identification information from the vehicle that performs the check-in; performing collation to determine whether the vehicle identification information acquired at the time of the reservation matches the vehicle identification information acquired at the time of the check-in; when it is determined as a result of the collation that the vehicle identification information at the time of the reservation matches the vehicle identification information at the time of the check-in, permitting the check-in such that the charging of the vehicle at the charging station is able to be performed; and generating, at the time of the reservation, error information indicating, among the details of the errors, a detail of an error that has occurred in a past for a combination of the vehicle that makes reservation and the charging station that is a candidate for the reservation, based on the charging error database. The vehicle is configured to present the generated error information to an occupant at the time of the reservation.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

FIG. 3 is a diagram illustrating an example of a charging error database;

FIG. 7 is a diagram illustrating another display example of the navigation device at the time of the reservation;

FIG. 8 is a sequence chart illustrating a process flow of the charging station and the vehicle at the time of check-in; and FIG. 9 is a sequence chart illustrating a process flow of the vehicle and the server apparatus at the time of the check-in.

DETAILED DESCRIPTION

A vehicle such as an electric vehicle having an electric motor as a drive source may attempt to charge an in-vehicle battery at a charging station. However, when the vehicle arrives at the charging station, the vehicle may be unable to be charged because the charging station is being used. It is desired that the vehicle can smoothly be charged when arriving at the charging station.

Therefore, it is desirable to provide a charging system in which charging can smoothly be performed.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
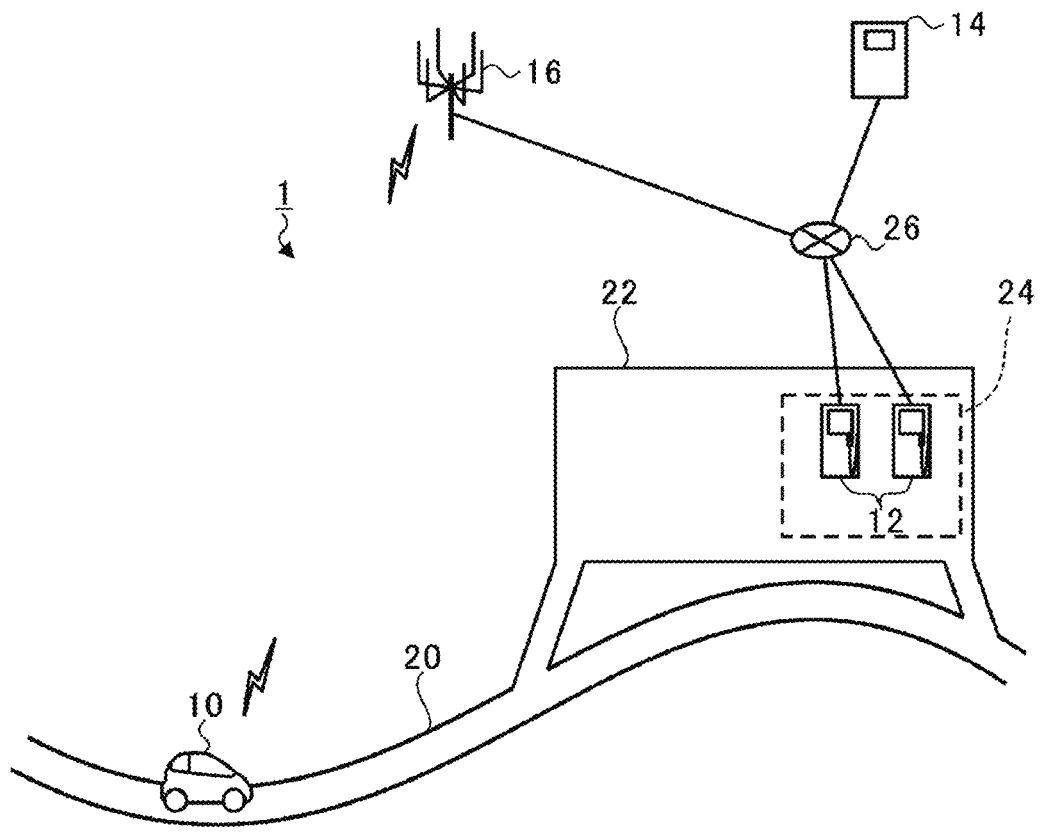
FIG. 1 is a diagram illustrating an overview of a charging system according to an embodiment.

FIG. 1 is a diagram illustrating an overview of a charging system 1 according to the present embodiment. The charging system 1 includes a vehicle 10, a charging station 12, a server apparatus 14, and a base station 16. The vehicle 10 is an electric vehicle having an in-vehicle battery that supplies electric power to a drive source. Note that the vehicle 10 may be a hybrid electric vehicle.

As will be described in detail later, the charging station 12 is configured to be able to charge the in-vehicle battery of the vehicle 10. Hereinafter, charging of the in-vehicle battery may be simply referred to as charging. The expression "charging of the vehicle 10" therefore refers to the charging of the in-vehicle battery of the vehicle 10.

For example, the charging station 12 is installed to correspond to a predetermined position on a travel road 20.

FIG. 1 illustrates an example in which the charging station 12 is installed in a rest area 22 on an expressway as the travel road 20. Herein, an expressway is given as the travel road 20, but the present disclosure is not limited to such a case, and can be applied to various roads on which the vehicle 10 can travel.

Herein, an example is given in which two charging stations 12 are installed in the rest area 22, but the number of charging stations 12 is not limited to two, and may be one, or three or more. Herein, an area in which the charging station 12 is installed and the vehicle 10 is permitted to enter for the purpose of charging is referred to as a charging area 24.

The server apparatus 14 is, for example, a cloud server or the like, and can manage charging stations 12.

The base station 16 communicates with the vehicle 10 via, for example, a mobile communication system using 4G, 5G, or the like. However, the base station 16 is connected to the vehicle 10 via any wireless communication. Therefore, as a wireless communication system, for example, a communication system such as ITS (Intelligent Transport Systems), ETC (Electronic Toll Collection System), or VICS (Vehicle Information and Communication System) (registered trademark) can be adopted.

Figure 2:
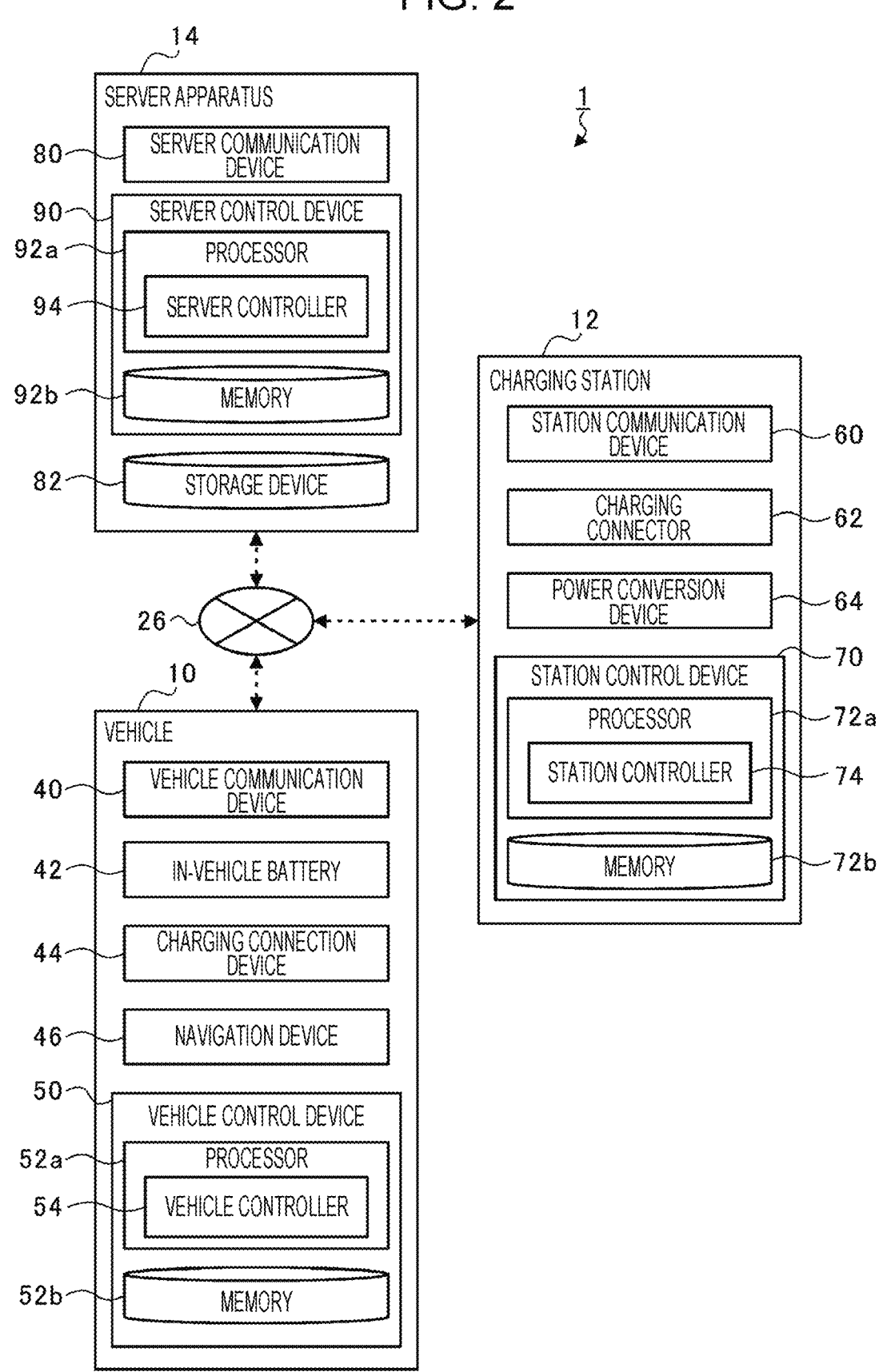
FIG. 2 is a block diagram illustrating an example of configurations of a vehicle, a charging station, and a server apparatus that constitute the charging system.

FIG. 2 is a block diagram illustrating an example of configurations of the vehicle 10, the charging station 12, and the server apparatus 14 that constitute the charging system 1. The vehicle 10, the charging station 12, and the server apparatus 14 are configured to be able to communicate with each other via, for example, a communication network 26.

The vehicle 10 includes a vehicle communication device 40, an in-vehicle battery 42, a charging connection device 44, a navigation device 46, and a vehicle control device 50. The vehicle communication device 40 can establish communication with the charging station 12 and the server apparatus 14 through the communication network 26.

The in-vehicle battery 42 is, for example, a chargeable and dischargeable secondary battery, such as a lithium-ion battery. The charging connection device 44 has a charging port exposed to the outside, and is configured such that a charging connector 62 of the charging station 12, which will be described later, can be connected thereto. The charging connection device 44 serves as a connection portion that electrically connects the charging station 12 and the in-vehicle battery 42.

The navigation device 46 can identify the location of the vehicle 10 by using a global positioning system (GPS). The navigation device 46 includes a display device capable of displaying various kinds of information, such as map information, a traveling route, and the location of the vehicle 10. The map information may include information on the travel road 20 and information on the installation position of the charging station 12.

The navigation device 46 also serves as a notifier that notifies an occupant of information related to the vehicle 10 and as an operation member that accepts the occupant's operation. For example, the navigation device 46 can display information related to the charging of the vehicle 10 on the display device in addition to or instead of the above kinds of information. In addition, the navigation device 46 can accept the occupant's operation input with respect to an option regarding the charging of the vehicle 10 through, for example, a touch panel or the like provided in the navigation device 46.

The vehicle control device 50 includes at least one processor 52a and at least one memory 52b coupled to the at least one processor 52a. The memory 52b includes a read-only memory (ROM) in which a program and the like are stored and a random-access memory (RAM) as a work area. The processor 52a controls the entirety of the vehicle 10 in cooperation with the program included in the memory 52b. The processor 52a also serves as a vehicle controller 54 by executing the program. The vehicle controller 54 executes various processes related to the charging of the vehicle 10.

The charging station 12 includes a station communication device 60, the charging connector 62, a power conversion device 64, and a station control device 70. The station communication device 60 can establish communication with the server apparatus 14 and the vehicle 10 through the communication network 26.

The charging connector 62 is configured to be connectable to the charging connection device 44 of the vehicle 10. For example, the power conversion device 64 converts electric power of a commercial power supply, and supplies the electric power to the vehicle 10 through the charging connector 62 and the charging connection device 44. In this way, the in-vehicle battery 42 can be charged.

The station control device 70 includes at least one processor 72a and at least one memory 72b coupled to the at least one processor 72a. The memory 72b includes a ROM in which a program and the like are stored and a RAM as a work area. The processor 72a controls the entirety of the charging station 12 in cooperation with the program included in the memory 72b. The processor 72a also serves as a station controller 74 by executing the program. The station controller 74 performs various processes related to the charging of the vehicle 10.

The server apparatus 14 includes a server communication device 80, a storage device 82, and a server control device 90. The server communication device 80 can establish communication with the charging station 12 and the vehicle 10 through the communication network 26.

The storage device 82 is constituted by a non-volatile storage element. Note that the non-volatile storage element may include an electrically readable and writable non-volatile storage element, such as a flash memory, for example.

The server control device 90 includes at least one processor 92a and at least one memory 92b coupled to the at least one processor 92a. The memory 92b includes a ROM in which a program and the like are stored and a RAM as a work area. The processor 92a controls the entirety of the server apparatus 14 in cooperation with the program included in the memory 92b. The processor 92a also serves as a server controller 94 by executing the program. The server controller 94 executes various processes related to the charging of the vehicle 10.

Any vehicle 10 as above having an electric motor as a drive source attempts to charge the in-vehicle battery 42 at the charging station 12 as a state of charge (SOC) of the in-vehicle battery 42 decreases. For example, when any vehicle 10 is traveling on the travel road 20, the vehicle 10 may stop by the rest area 22 and charge the in-vehicle battery 42 at the charging station 12 in the rest area 22.

Herein, to perform the charging of the vehicle 10 at the charging station 12, check-in is performed in the charging system 1. The check-in is a procedure for starting the charging of the vehicle 10 at the charging station 12. The charging of the vehicle 10 can be performed at the charging station 12 after the check-in is permitted in the charging system 1. The check-in is performed near the charging station 12. In more detail, the check-in is performed when the vehicle 10 enters the charging area 24 in which the charging station 12 is installed.

For example, a gate is provided at an entrance/exit of the charging area 24 in which the charging station 12 is installed. The check-in is performed at the entrance/exit gate of the charging area 24. When the check-in is permitted, the gate is opened, and the vehicle 10 can enter the charging area 24. On the other hand, when the check-in is not permitted, the gate is maintained in the closed state, and the vehicle 10 is not able to enter the charging area 24.

In the charging system 1, when the charging is finished and the vehicle 10 leaves the charging station 12, check-out may be performed. The check-out is a procedure for finishing the charging of the vehicle 10 at the charging station 12. The check-out is performed at the charging station 12 or at the entrance/exit gate of the charging area 24. For example, when a payment of a price for the charging of the vehicle 10 is completed, the check-out is automatically completed.

The charging system 1 is configured such that a reservation for the charging of the vehicle 10 at the charging station 12 can be made before the check-in. Any vehicle 10 predicts an arrival time at the charging station 12, at a timing when the vehicle 10 has not arrived at the rest area 22, for example, when the vehicle 10 is traveling on the travel road 20, and reserves a desired charging period from the arrival time. Note that a start time of the reserved charging may be referred to as a reserved start time, and an end time of the reserved charging may be referred to as a reserved end time. In this way, when any vehicle 10 arrives at the charging station 12, the in-vehicle battery 42 can be charged from the reserved start time without waiting for the charging.

The server apparatus 14 can perform a process of accepting the check-in of the vehicle 10 at the charging station 12. The server apparatus 14 can also perform a process of accepting the reservation for the charging of the vehicle 10 at the charging station 12.

Hereinafter, for convenience of description, the vehicle 10 that makes the reservation may be referred to as a first vehicle. Any vehicle 10 different from the first vehicle may be referred to as a second vehicle.

The storage device 82 of the server apparatus 14 may store a check-in permission table, a reservation permission table, and a charging error database.

The check-in permission table is a table in which the vehicle 10 that is currently permitted to check in and the charging station 12 are managed in association with each other. When the check-in of the vehicle 10 is permitted, the server controller 94 adds the permitted vehicle 10 to the check-in permission table. When the vehicle 10 checks out, the server controller 94 deletes the checked-out vehicle 10 from the check-in permission table. In this way, the check-in permission table is updated.

The reservation permission table is a table in which the vehicle 10 that is currently permitted to make the reservation and the charging station 12 are managed in association with each other. When the reservation for the charging of the vehicle 10 is permitted, the server controller 94 adds the permitted vehicle 10 to the reservation permission table. When the check-in is permitted for the vehicle 10 that has made the reservation, the server controller 94 deletes the check-in-permitted vehicle 10 from the reservation permission table. In this way, the reservation permission table is updated. Note that the reservation permission table is also updated when the reservation is canceled or when the vehicle 10 does not check in even after the end time of the reserved charging period has passed.

FIG. 3 is a diagram illustrating an example of the charging error database. The charging error database accumulates a history of errors at the time of the charging of the vehicle 10 at the charging station 12. In the charging error database, the charging area 24, the charging station 12, the model of the vehicle 10, and details of the errors are associated with each other.

When an error has occurred at the charging station 12, the station controller 74 transmits, to the server apparatus 14, the charging station 12 at which the error has occurred, the model of the vehicle 10, and the detail of the error that has occurred. Upon receiving information such as the detail of the error, the server apparatus 14 stores the received information such as the detail of the error in the storage device 82 and updates the charging error database. In this way, the history of errors at the time of the charging of the vehicle 10 at the charging station 12 is accumulated in the charging error database.

In FIG. 3, a connector connection error, a credit card reading error, and an excessive voltage error are illustrated as examples of the details of errors registered in the charging error database. The connector connection error indicates that the charging connection device 44 of the vehicle 10 and the charging connector 62 of the charging station 12 are not able to be mechanically connected to each other. The credit card reading error indicates that the charging station 12 is not able to read a credit card of the occupant of the vehicle 10. The excessive voltage error indicates that the voltage applied from the charging station 12 to the vehicle 10 is excessive relative to the receiving voltage of the vehicle 10. However, the details of the errors registered in the charging error database are not limited to the types of errors described above, and details of various errors that may occur at the time of charging may be registered in the charging error database.

Figure 4:
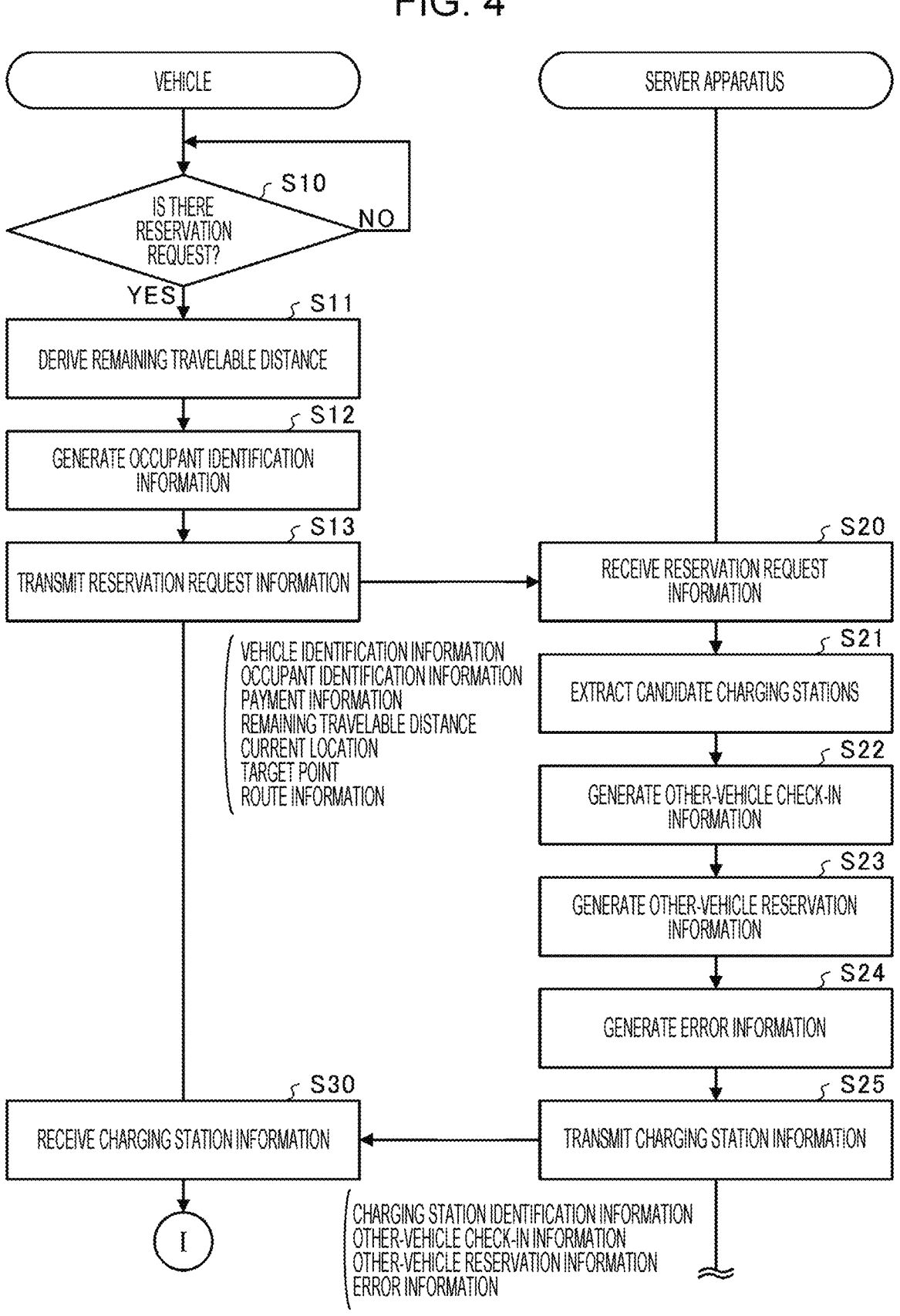
FIG. 4 is a sequence chart illustrating a process flow of the vehicle and the server apparatus at the time of reservation for charging.
Figure 5:
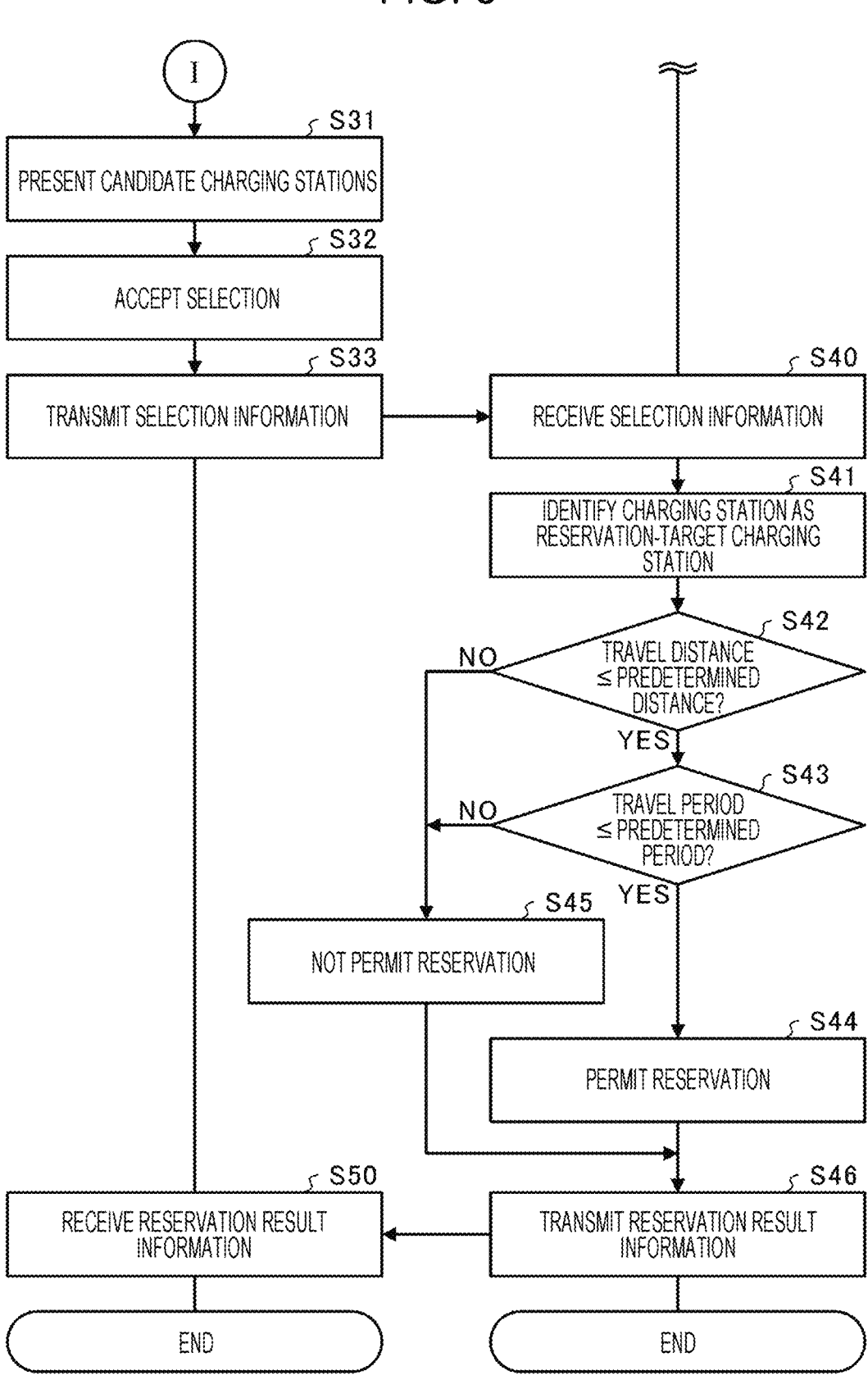
FIG. 5 is a sequence chart illustrating the process flow of the vehicle and the server apparatus at the time of the reservation for charging.

FIGS. 4 and 5 are sequence charts illustrating a process flow of the vehicle 10 and the server apparatus 14 at the time of the reservation for charging. "A" in FIG. 4 is linked to "A" in FIG. 5. For example, the occupant of the vehicle 10 can input a charging reservation request through the navigation device 46.

As illustrated in FIG. 4, when there is no charging reservation request (NO in S10), the vehicle controller 54 waits until there is a reservation request. Upon detecting the charging reservation request (YES in S10), the vehicle controller 54 derives a remaining travelable distance at a current time point (S11). The remaining travelable distance indicates how much distance can be traveled with a current SOC. For example, the vehicle controller 54 derives a remaining charge amount of the in-vehicle battery 42 at the current time point, based on the SOC at the current time point. The vehicle controller 54 derives the remaining travelable distance by multiplying a travelable distance per unit charge amount by the remaining charge amount at the current time point.

Subsequently, the vehicle controller 54 generates occupant identification information for identifying at least one occupant in the vehicle 10 (S12). For example, the vehicle 10 is provided with a camera capable of capturing an image of the occupant in a cabin. The vehicle controller 54 generates, as the occupant identification information, image information of the occupant's face in the cabin captured by the camera. Note that the occupant identified by the occupant identification information is not limited to a driver, and may be an occupant who is not driving.

The occupant identification information is not limited to an aspect in which the occupant identification information is generated from the occupant's image captured by the camera. For example, an image of a driver's license of the occupant of the vehicle 10 may be registered in the vehicle 10 in advance, and image information of the registered driver's license may be used as the occupant identification information. The occupant identification information is not limited to image information, and may be, for example, text information such as an address of the occupant.

Subsequently, the vehicle controller 54 transmits reservation request information for requesting the reservation to the server apparatus 14 through the vehicle communication device 40 (S13). The reservation request information includes vehicle identification information for identifying the vehicle 10, the occupant identification information, payment information for identifying that the price for the charging of the vehicle 10 is payable, the remaining travelable distance, a current location of the vehicle 10, a target point, and route information.

As the payment information, for example, a credit card number can be used. For example, a credit card number of the occupant of the vehicle 10 may be registered in the vehicle 10 in advance, and the registered credit card number may be used as the payment information. As the current location, a current location of the vehicle 10 detected by the navigation device 46 can be used.

When the target point and the route information are not set in the navigation device 46, the target point and the route information may be omitted in the reservation request information.

The server controller 94 receives the reservation request information from the vehicle 10 through the server communication device 80 (S20). Thus, the server controller 94 can acquire the vehicle identification information, the occupant identification information, the payment information, and the like of the vehicle 10 that requests the reservation. As will be described later, the vehicle identification information, the occupant identification information, and the payment information acquired at the time of the reservation in this way are collated at the time of the check-in after the reservation, and are used to determine whether to permit the check-in.

Subsequently, based on the remaining travelable distance and the current location of the vehicle 10 that are acquired, the server controller 94 extracts charging stations 12 that are present within the range of the remaining travelable distance from the current location as charging stations 12 that are candidates for the reservation (S21). Based on the target point and the route information that are acquired, the server controller 94 may extract, as the charging stations 12 that are the candidates for the reservation, charging stations 12 that are within the range of the remaining travelable distance from the current location and that are present on the route from the current location to the target point.

Based on the check-in permission table stored in the storage device 82, the server controller 94 generates other-vehicle check-in information for all of the charging stations 12 extracted as the candidates for the reservation (S22). The other-vehicle check-in information indicates whether the second vehicle, which is another vehicle for the first vehicle, has already checked in at a charging station 12 that is a target of the reservation. The other-vehicle check-in information may include, in addition to information on whether the second vehicle has checked in, information on the number of second vehicles that have already checked in.

Based on the reservation permission table stored in the storage device 82, the server controller 94 generates other-vehicle reservation information for all of the charging stations 12 extracted as the candidates for the reservation (S23).

The other-vehicle reservation information indicates whether the second vehicle, which is another vehicle for the first vehicle, has already made a reservation at the charging station 12 that is the target of the reservation. The other-vehicle reservation information may include, in addition to information on whether the second vehicle has made a reservation, information on the number of second vehicles that have already made reservations.

Based on the charging error database stored in the storage device 82, the server controller 94 generates error information for all of the charging stations 12 extracted as the candidates for the reservation (S24). The error information indicates a detail of an error that has occurred in the past for a combination of the vehicle 10 that makes the reservation and the charging station 12 that is a candidate for the reservation.

The server controller 94 transmits, through the server communication device 80, charging station information related to the charging stations 12 that are the candidates for the reservation to the vehicle 10 that has transmitted the reservation request information (S25). The charging station information to be transmitted includes charging station identification information for identifying the charging stations 12 that are the candidates for the reservation, the other-vehicle check-in information, the other-vehicle reservation information, and the error information.

The vehicle controller 54 receives, through the vehicle communication device 40, the charging station information transmitted from the server apparatus 14 (S30). Thus, the occupant of the vehicle 10 can recognize the charging stations 12 that are the candidates for the reservation. Then, the vehicle 10 can acquire the other-vehicle check-in information, the other-vehicle reservation information, and the error information for each of the charging stations 12 that are the candidates for the reservation.

In FIG. 5, the vehicle controller 54 causes, for example, the display device of the navigation device 46 to display the charging stations 12 that are the candidates for the reservation to present them to the occupant of the vehicle 10 (S31). At this time, the vehicle controller 54 also causes, for example, the display device of the navigation device 46 to display the other-vehicle check-in information, the other-vehicle reservation information, and the error information to present them to the occupant of the vehicle 10.

Figure 6:
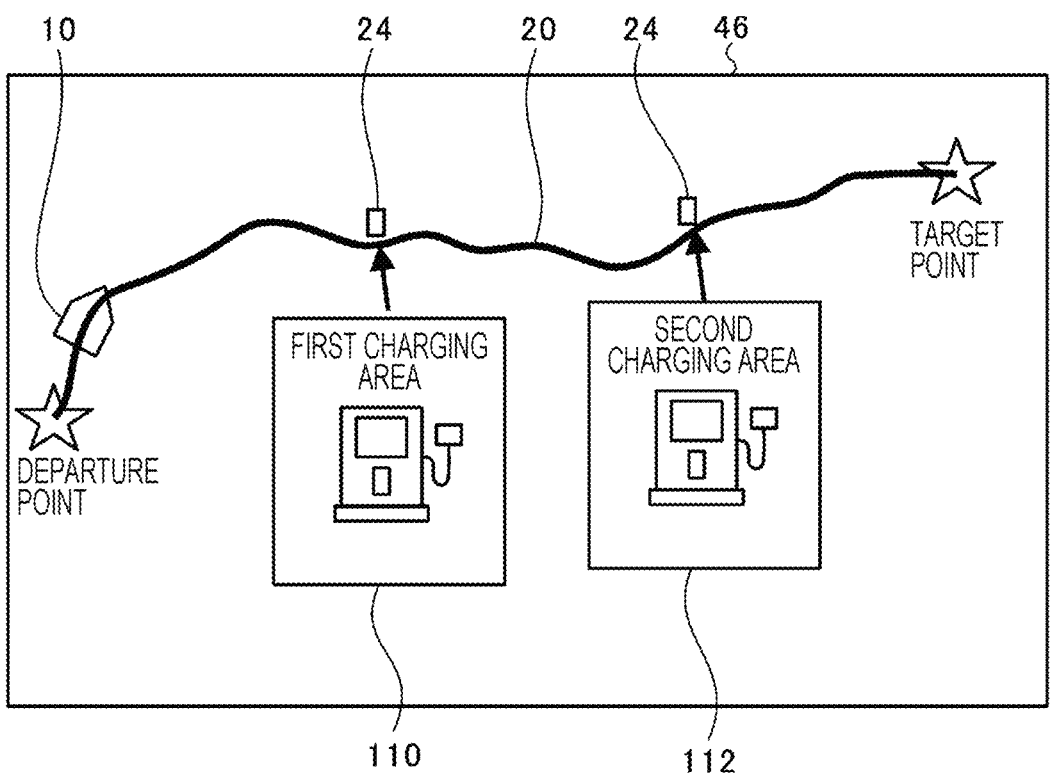
FIG. 6 is a diagram illustrating a display example of a navigation device at the time of the reservation.

FIG. 6 is a diagram illustrating a display example of the navigation device 46 at the time of the reservation. As illustrated in FIG. 6, the current location, the target point, and the traveling route of the vehicle 10 are displayed on the navigation device 46.

As charging areas 24 in which the charging stations 12 that are the candidates for the reservation are installed, a first charging area 110 and a second charging area 112 are displayed on the navigation device 46. The first charging area 110 and the second charging area 112 are positioned substantially along the traveling route. The first charging area 110 is closer to the current location of the vehicle 10 than the second charging area 112.

FIG. 7 is a diagram illustrating another display example of the navigation device 46 at the time of the reservation. For example, the occupant of the vehicle 10 can switch from the display screen of FIG. 6 to the display screen of FIG. 7 by touching a screen of the navigation device 46.

As illustrated in FIG. 7, the charging stations 12 belonging to the charging area 24 are displayed on the navigation device 46 for each of the first charging area 110 and the second charging area 112. The other-vehicle check-in information, the other-vehicle reservation information, and the error information are also displayed on the navigation device 46 in association with the charging stations 12.

The occupant of the vehicle 10 can select a charging station 12 to be reserved from among the charging stations 12 that are the candidates for the reservation presented through the navigation device 46.

Since the other-vehicle check-in information, the other-vehicle reservation information, and the error information are displayed on the navigation device 46, the occupant of the vehicle 10 can examine the charging station 12 to be reserved.

Herein, an example has been described in which the other-vehicle check-in information, the other-vehicle reservation information, and the error information are generated and presented. However, the vehicle controller 54 presents at least the charging stations 12 that are the candidates for the reservation, and may omit the generation and presentation of any one or more of the other-vehicle check-in information, the other-vehicle reservation information, and the error information.

Returning to FIG. 5, the vehicle controller 54 accepts, through the navigation device 46, the selection of the charging station 12 to be reserved (S32).

The vehicle controller 54 transmits selection information indicating the charging station 12 selected as the charging station 12 to be reserved to the server apparatus 14 through the vehicle communication device 40 (S33).

The server controller 94 receives the selection information transmitted from the vehicle 10 through the server communication device 80 (S40).

The server controller 94 identifies the charging station 12 indicated by the received selection information as a reservation-target charging station that is the target of the reservation (S41).

The server controller 94 derives a travel distance from the current location of the vehicle 10 to the reservation-target charging station, based on the map information and the route information. Then, the server controller 94 determines whether the derived travel distance is within a predetermined distance (S42).

When it is determined that the travel distance is within the predetermined distance (YES in S42), the server controller 94 derives a travel period taken to travel from the current location of the vehicle 10 to the reservation-target charging station. For example, the server controller 94 may derive the travel period from congestion information, a speed limit, or the like on the route from the current location of the vehicle 10 to the reservation-target charging station. Then, the server controller 94 determines whether the derived travel period is within a predetermined period (S43). That is, in step S43, it is determined whether the vehicle 10 can arrive at the reservation-target charging station within the predetermined period from the current time point.

When it is determined that the distance determination in step S42 is satisfied (YES in S42) and it is determined that the period determination in step S43 is satisfied (YES in S43), the server controller 94 permits the reservation for charging at the reservation-target charging station (S44). In response to the permission of the reservation, the server controller 94 confirms the reservation by storing details of the permitted reservation in the storage device 82. Note that the vehicle identification information of the vehicle 10 has been acquired in step S20 in FIG. 4.

On the other hand, when it is determined that the distance determination in step S42 is not satisfied (NO in S42), or when it is determined that the period determination in step S43 is not satisfied (NO in S43), the server controller 94 does not permit the reservation (S45).

This can suppress reservations at the reservation-target charging station that is excessively distant from the current location of the vehicle 10. As a result, for example, it is possible to suppress the possibility that the reservation is canceled.

Note that the server controller 94 is not limited to the aspect of performing both the distance determination in step S42 and the period determination in step S43. For example, the server controller 94 may perform one of the distance determination and the period determination, and skip the other. In an aspect in which the period determination is skipped and the distance determination is performed, the server controller 94 may permit the reservation when the vehicle identification information is acquired and the distance determination is satisfied. In an aspect in which the distance determination is skipped and the period determination is performed, the server controller 94 may permit the reservation when the vehicle identification information is acquired and the period determination is satisfied.

The server controller 94 transmits, through the server communication device 80, reservation result information indicating the permission or non-permission of the reservation to the vehicle 10 that has transmitted the selection information (S46). When the reservation is permitted, the server controller 94 may update the reservation permission table.

The vehicle controller 54 receives, through the vehicle communication device 40, the reservation result information transmitted from the server apparatus 14 (S50). The vehicle controller 54 causes the display device of the navigation device 46 to display the reservation result information. Thus, the occupant of the vehicle 10 can recognize whether the reservation of the selected charging station 12 has been permitted.

When the reservation result information indicating the non-permission of the reservation is acquired, the vehicle controller 54 may cause the display device of the navigation device 46 to display the charging stations 12 that are the candidates for the reservation again and prompt the occupant to select another one of the charging stations 12.

When the reservation is permitted, the server controller 94 may inquire the vehicle 10 of whether to confirm the reservation. In this case, the server controller 94 may confirm the reservation by storing the details of the reservation in the storage device 82, after receiving an instruction to confirm the reservation from the vehicle 10.

Figure 8:
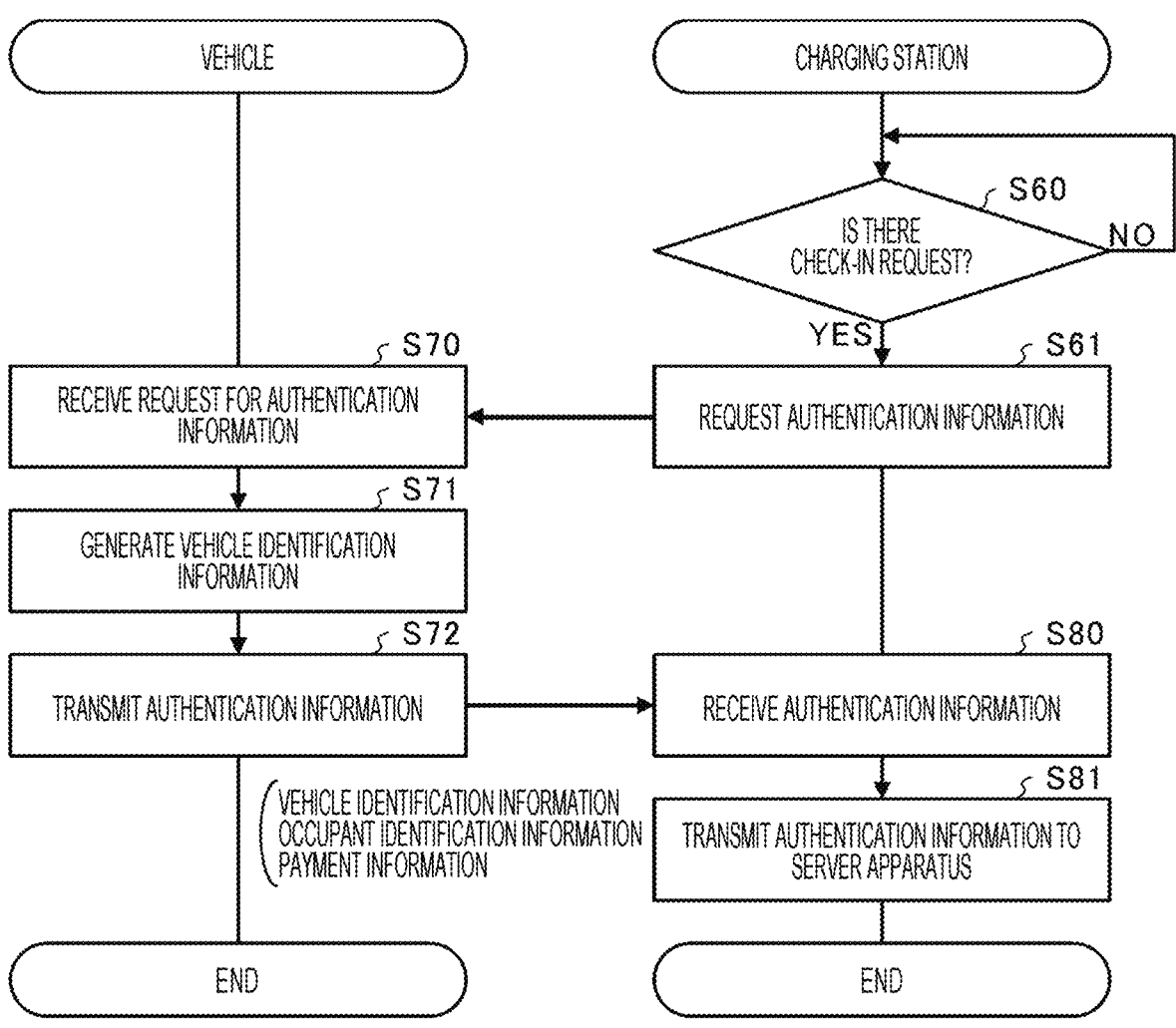

FIG. 8 is a sequence chart illustrating a process flow of the charging station 12 and the vehicle 10 at the time of the check-in. When the vehicle 10 arrives at the gate of the charging area 24, the charging station 12 detects the generation of a check-in request of the vehicle 10 that has arrived at the gate.

When there is no check-in request (NO in S60), the station controller 74 waits until there is a check-in request. Upon detecting the generation of the check-in request (YES in S60), the station controller 74 transmits information for requesting the transmission of authentication information for performing the check-in to the vehicle 10 that has arrived at the gate (S61).

The vehicle controller 54 receives the information for requesting the transmission of the authentication information through the vehicle communication device 40 (S70).

The vehicle controller 54 generates the occupant identification information at the time of the check-in (S71). Note that the occupant identification information is generated in the same manner as that at the time of the reservation.

The vehicle controller 54 transmits the authentication information at the time of the check-in to the charging station 12 (S72). The authentication information includes the vehicle identification information, the occupant identification information, and the payment information.

The station controller 74 receives the authentication information from the vehicle 10 (S80). The station controller 74 transmits the received authentication information to the server apparatus 14 (S81).

Figure 9:
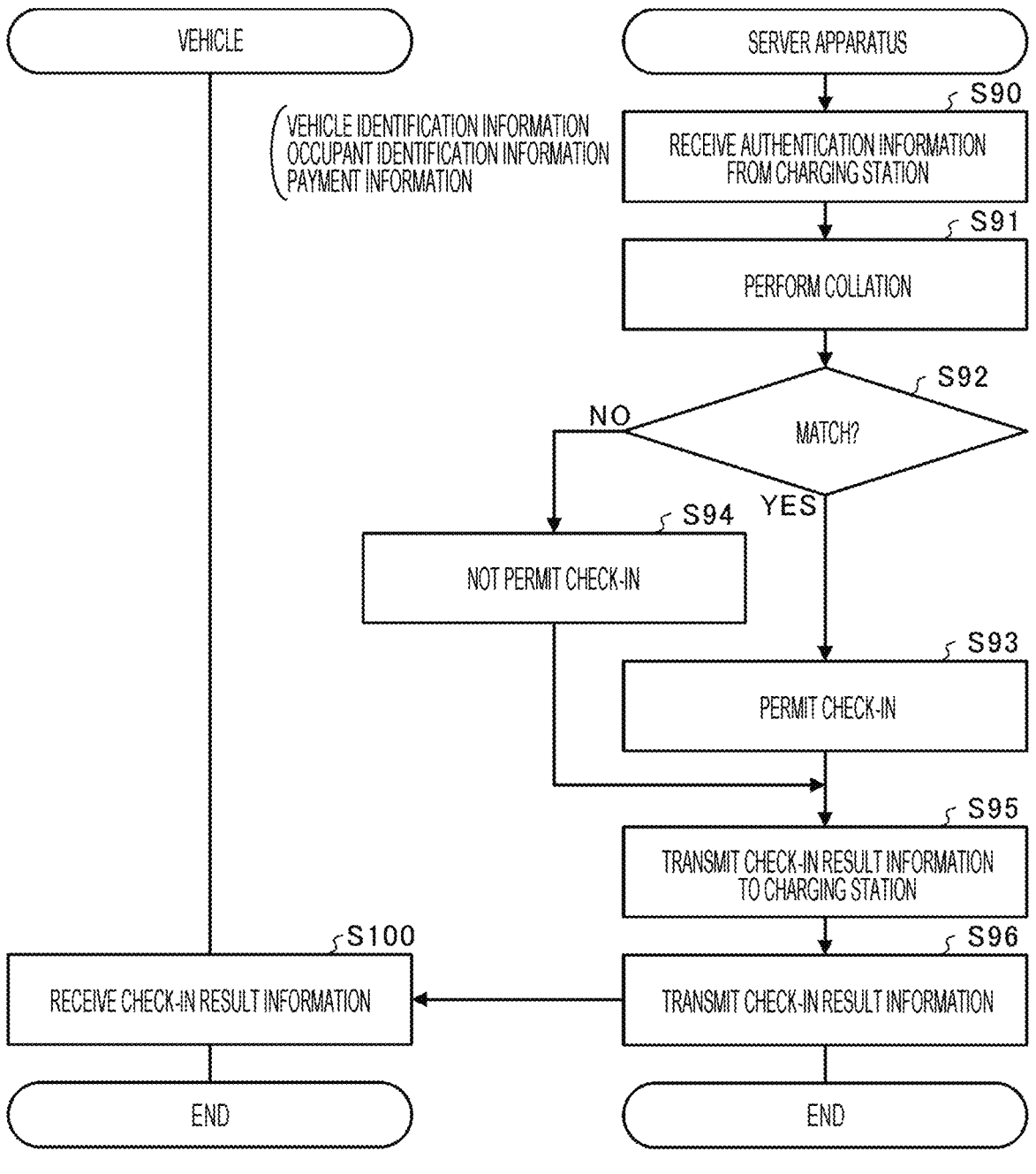

FIG. 9 is a sequence chart illustrating a process flow of the vehicle 10 and the server apparatus 14 at the time of the check-in.

The server controller 94 receives the authentication information of the vehicle 10 transferred from the charging station 12 (S90). Thus, the server controller 94 acquires the vehicle identification information, the occupant identification information, and the payment information at the time of the check-in of the vehicle 10.

The server controller 94 performs collation for the vehicle 10 that has transmitted the authentication information, to determine whether the vehicle identification information, the occupant identification information, and the payment information at the time of the reservation match the vehicle identification information, the occupant identification information, and the payment information at the time of the check-in (S91).

When the server controller 94 determines as a result of the collation that all of the vehicle identification information, the occupant identification information, and the payment information at the time of the reservation match those at the time of the check-in (YES in S92), the server controller 94 permits the check-in (S93). In a case where the occupant identification information includes information of occupants, when there is at least one identical occupant at the time of the reservation and at the time of the check-in, it may be determined that the occupant identification information at the time of the reservation matches that at the time of the check-in.

On the other hand, when the server controller 94 determines as a result of the collation that at least one of the vehicle identification information, the occupant identification information, and the payment information at the time of the reservation does not match at least one of them at the time of the check-in (NO in S92), the server controller 94 does not permit the check-in (S94).

In the collation, the server controller 94 performs authentication as to whether the vehicle identification information, the occupant identification information, and the payment information are appropriate, and when it is determined that the information is not appropriate, the check-in may not be permitted. For example, when the credit card number included in the payment information has expired, the server controller 94 may not permit the check-in. Thus, the security of the charging area 24 can be improved.

The server controller 94 transmits check-in result information indicating the permission or non-permission of the check-in to the charging station 12 through the server communication device 80 (S95). When the check-in is permitted, the server controller 94 may update the check-in permission table.

When the received check-in result information indicates the permission of the check-in, the station controller 74 opens the gate of the charging area 24. Thus, the vehicle 10 that has arrived at the gate can enter the charging area 24, and the charging of the vehicle 10 at the charging station 12 can be performed.

When the received check-in result information indicates the non-permission of the check-in, the station controller 74 maintains the gate of the charging area 24 in the closed state. Thus, it is presumed that the vehicle 10 that has arrived at the gate is not the vehicle that has made the reservation, and the vehicle 10 is not able to enter the charging area 24, and the charging at the charging station 12 is not able to be performed.

In addition, the server controller 94 transmits the check-in result information indicating the permission or non-permission of the check-in to the vehicle 10 that has transmitted the authentication information (S96).

The vehicle controller 54 receives the check-in result information from the server apparatus 14 (S100). Thus, the vehicle controller 54 causes the display device of the navigation device 46 to display the check-in result information. Accordingly, the occupant of the vehicle 10 can recognize whether the check-in is permitted.

Herein, an example in which all of the vehicle identification information, the occupant identification information, and the payment information are collated has been described. However, the server controller 94 may acquire at least the vehicle identification information at the time of the reservation, and may omit the acquisition of the occupant identification information and the payment information. In this case, the server controller 94 may acquire at least the vehicle identification information at the time of the check-in, and may omit the acquisition of the occupant identification information and the payment information. The server controller 94 may perform the collation to determine whether the vehicle identification information acquired at the time of the reservation matches the vehicle identification information acquired at the time of the check-in. When it is determined as a result of the collation that the vehicle identification information at the time of the reservation matches the vehicle identification information at the time of the check-in, the server controller 94 may permit the check-in such that the charging of the vehicle 10 at the charging station 12 can be performed.

In addition, the server controller 94 may acquire, at the time of the reservation, one or both of the occupant identification information and the payment information in addition to the vehicle identification information from the vehicle 10 that makes the reservation. In this case, at the time of the check-in, the server controller 94 may acquire, in addition to the vehicle identification information, information of the same type as the type of the information acquired at the time of the reservation out of the occupant identification information and the payment information from the vehicle 10 that performs the check-in. The server controller 94 may determine whether the information acquired among the vehicle identification information, the occupant identification information, and the payment information at the time of the reservation matches the information acquired among the vehicle identification information, the occupant identification information, and the payment information at the time of the check-in. When it is determined that, among the vehicle identification information, the occupant identification information, and the payment information, the information acquired at the time of the reservation matches the information acquired at the time of the check-in, the server controller 94 may permit the check-in such that the charging of the vehicle 10 at the charging station 12 can be performed.

In addition, the server controller 94 may acquire, at the time of the reservation, at least the vehicle identification information, and may omit the acquisition of the occupant identification information and the payment information. In this case, at the time of the check-in, the server controller 94 may acquire, in addition to the vehicle identification information, one or both of the occupant identification information and the payment information from the vehicle 10 that performs the check-in. The server controller 94 may perform the collation to determine whether the vehicle identification information acquired at the time of the reservation matches the vehicle identification information acquired at the time of the check-in. The server controller 94 may perform authentication as to whether the information of the type acquired at the time of the check-in among the vehicle identification information, the occupant identification information, and the payment information is appropriate. The server controller 94 may permit the check-in when both the collation and the authentication are satisfied. Thus, the security of the charging area 24 can be improved.

As described above, the server controller 94 in the charging system 1 of the present embodiment acquires the vehicle identification information at the time of the reservation from the vehicle 10 that makes the reservation, and acquires the vehicle identification information at the time of the check-in from the vehicle 10 that performs the check-in. The server controller 94 performs the collation to determine whether the vehicle identification information acquired at the time of the reservation matches the vehicle identification information acquired at the time of the check-in. When it is determined as a result of the collation that the vehicle identification information at the time of the reservation matches the vehicle identification information at the time of the check-in, the server controller 94 permits the check-in such that the charging of the vehicle 10 at the charging station 12 can be performed.

Accordingly, in the charging system 1 of the present embodiment, the vehicle 10 can make the reservation for charging at the charging station 12 before arriving at the charging station 12, and thus can smoothly be charged after arriving at the charging station 12.

In addition, in the charging system 1 of the present embodiment, since the vehicle identification information at the time of the reservation is collated with the vehicle identification information at the time of the check-in, the vehicle 10 that has appropriately made the reservation can be charged. Thus, the charging management at the charging station 12 can be improved.

Although the embodiment of the present disclosure has been described above with reference to the accompanying drawings, the present disclosure is not limited to the embodiment. It is clear that those skilled in the art can conceive of various modifications or corrections within the scope described in the claims. It is to be understood that these are naturally included in the technical scope of the disclosure.

The series of steps performed by each apparatus (for example, the vehicle 10 or the server apparatus 14) according to the present embodiment described above may be implemented by using any of software, hardware, or a combination of software and hardware. A program constituting the software is stored in advance in, for example, a non-transitory medium provided inside or outside each apparatus. For example, the program is read from the non-transitory medium (for example, a ROM) to a transitory medium (for example, a RAM) and executed by a processor such as a CPU.

It is possible to create a program for implementing each function of each apparatus described above and install the program in a computer of each apparatus described above. By executing the program stored in a memory, the processor executes the processing of each function described above. At this time, the program may be shared and executed by processors, or the program may be executed by a single processor. In addition, each function of each apparatus described above may be implemented by cloud computing using computers connected to each other via a communication network. Note that the program may be provided to and installed in the computer of each apparatus by being distributed from an external apparatus via a communication network.

According to the present disclosure, charging can smoothly be performed.

The invention claimed is:

1. A charging system comprising:

a charging station configured to charge a vehicle;

a control device; and a storage device configured to store a charging error database in which a history of errors at a time of charging of the vehicle at the charging station is accumulated in association with the charging station, the vehicle, and details of the error, the details of the errors including at least one of a connector connection error, a credit card reading error, or an excessive voltage error, wherein the control device comprises:

at least one processor; and at least one memory coupled to the at least one processor, the at least one processor is configured to perform a process comprising:

accepting check-in that is a procedure for starting the charging of the vehicle at the charging station;

accepting, before the check-in, a reservation for the charging of the vehicle at the charging station;

receiving, at a time of the reservation, vehicle identification information that is information identifying the vehicle from the vehicle that makes the reservation;

receiving, at a time of the check-in, the vehicle identification information from the vehicle that performs the check-in;

comparing the vehicle identification information acquired at the time of the reservation with the vehicle identification information acquired at the time of the check-in;

upon detecting that the vehicle identification information at the time of the reservation matches the vehicle identification information at the time of the check-in, permitting the charging of the vehicle at the charging station; and generating, at the time of the reservation, for each charging station that is a candidate for the reservation, error information indicating, among the details of the errors stored in the charging error database, details of one or more errors that occurred when the vehicle making the reservation was charged at that charging station, based on the charging error database, wherein the vehicle is configured to display, on a display device installed in the vehicle, for each charging station that is the candidate for the reservation, the generated error information associated with the charging station at the time of the reservation, wherein the charging station is installed in a charging area having a gate provided at an entrance of the charging area, and wherein the control device is configured to control the gate such that, when the charging of the vehicle at the charging station is permitted in response to detecting that the vehicle identification information at the time of the reservation matches the vehicle identification information at the time of the check-in, the gate is opened to allow the vehicle to enter the charging area, and, when the charging of the vehicle at the charging station is not permitted, the gate is maintained in a closed state.

2. The charging system according to claim 1, wherein the at least one processor is configured to perform a process comprising:

acquiring, at the time of the check-in, in addition to the vehicle identification information, one or both of occupant identification information for identifying at least one occupant comprising the occupant in the vehicle and payment information for identifying that a price for the charging of the vehicle is payable, from the vehicle that performs the check-in; and permitting the check-in when it is determined as a result of collation that the vehicle identification information at the time of the reservation matches the vehicle identification information at the time of the check-in and when information acquired at the time of the check-in among the vehicle identification information, the occupant identification information, and the payment information is appropriate.

3. The charging system according to claim 2, wherein the at least one processor is configured to perform a process comprising:

acquiring, at the time of the reservation, in addition to the vehicle identification information, one or both of the occupant identification information and the payment information, from the vehicle that makes the reservation;

acquiring, at the time of the check-in, in addition to the vehicle identification information, information of a same type as a type of the information acquired at the time of the reservation out of the occupant identification information and the payment information, from the vehicle that performs the check-in;

determining, in the collation, whether the information acquired at the time of the reservation among the vehicle identification information, the occupant identification information, and the payment information matches the information acquired at the time of the check-in among the vehicle identification information, the occupant identification information, and the payment information; and permitting the check-in such that the charging of the vehicle at the charging station is able to be performed when it is determined as a result of the collation that, among the vehicle identification information, the occupant identification information, and the payment information, the information acquired at the time of the reservation matches the information acquired at the time of the check-in.

4. The charging system according to claim 1, wherein the vehicle comprises a first vehicle and a second vehicle that is different from the first vehicle, wherein the at least one processor is configured to perform a process comprising:

generating, when the first vehicle makes the reservation, one or both of other-vehicle check-in information indicating whether the check-in of the second vehicle at the charging station that is a target of the reservation is present, and other-vehicle reservation information indicating whether the second vehicle has made the reservation at the charging station that is the target of the reservation, and wherein the first vehicle is configured to present one or both of the other-vehicle check-in information and the other-vehicle reservation information that are generated, to an occupant at the time of the reservation.

5. The charging system according to claim 1, wherein the at least one processor is configured to perform a process comprising:

performing, at the time of the reservation, a distance determination as to whether a distance from a current location of the vehicle to the charging station that is a target of the reservation is within a predetermined distance; and permitting the reservation when the vehicle identification information is acquired and the distance determination is satisfied.

6. The charging system according to claim 1, wherein the at least one processor is configured to perform a process comprising:

performing, at the time of the reservation, a period determination as to whether the vehicle is able to arrive at the charging station that is a target of the reservation within a predetermined period from a current time point; and permitting the reservation when the vehicle identification information is acquired and the period determination is satisfied.

* * * * *